(12) United States Patent
Sato et al.

(10) Patent No.: US 11,621,788 B2
(45) Date of Patent: Apr. 4, 2023

(54) TERAHERTZ WAVE CAMERA SYSTEM, ENTRY/EXIT MANAGEMENT APPARATUS, AND METHOD FOR CONTROLLING TERAHERTZ WAVE CAMERA SYSTEM

(71) Applicant: CANON KABUSHIKI KAISHA, Tokyo (JP)

(72) Inventors: Takahiro Sato, Kanagawa (JP); Yasushi Koyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/183,159

(22) Filed: Feb. 23, 2021

(65) Prior Publication Data

US 2021/0281327 A1  Sep. 9, 2021

(30) Foreign Application Priority Data

Mar. 3, 2020 (JP) .............................. JP2020-036119

(51) Int. Cl.
*H04B 10/00* (2013.01)
*H04B 10/90* (2013.01)
*H04B 10/071* (2013.01)
*H04B 10/532* (2013.01)

(52) U.S. Cl.
CPC ........... *H04B 10/90* (2013.01); *H04B 10/071* (2013.01); *H04B 10/532* (2013.01)

(58) Field of Classification Search
CPC ..... H04B 10/90; H04B 10/071; H04B 10/532
USPC .......................................................... 398/140
See application file for complete search history.

(56) References Cited

U.S. PATENT DOCUMENTS 7,164,932 B1 *  1/2007  Sato ...................... H01Q 25/00
                                                455/67.11
2019/0208113 A1 *  7/2019  Sandstrom ........... H04N 5/2256

FOREIGN PATENT DOCUMENTS

| CN | 103490814 A | * | 1/2014 | .......... H04B 10/116 |
| JP | H1183996 A | | 3/1999 | |
| JP | 2005 265793 | * | 9/2005 | .............. G01V 8/10 |
| JP | 2005265793 A | | 9/2005 | |
| JP | 2018087725 A | | 6/2018 | |
| JP | 2018156586 A | | 10/2018 | |
| JP | 2019045355 A | | 3/2019 | |
| WO | WO-2019040002 A1 | * | 2/2019 | ................ G01J 3/28 |

* cited by examiner

*Primary Examiner* — Mohammad R Sedighian
(74) *Attorney, Agent, or Firm* — Canon U.S.A., Inc. IP Division

(57) ABSTRACT

A system includes a transmission unit, a reception unit, and a lens unit and is placed in a passage, wherein in a case where a first plane that intersects a forward direction of the passage and is a surface of an object, and a second plane that intersects the forward direction of the passage, includes the lens unit, and is at a position different from a position of the first plane are set, a first area to which a terahertz wave from the transmission unit reflected from the first plane is emitted and the lens unit are disposed at positions different from each other on the second plane.

19 Claims, 11 Drawing Sheets

TERAHERTZ WAVE CAMERA SYSTEM, ENTRY/EXIT MANAGEMENT APPARATUS, AND METHOD FOR CONTROLLING TERAHERTZ WAVE CAMERA SYSTEM

BACKGROUND OF THE DISCLOSURE

Field of the Disclosure

The aspect of the embodiments relates to a terahertz wave camera system.

Description of the Related Art

It is known that a terahertz wave exhibits transmission properties through a substance such as clothes or packaging. The use of a terahertz wave having such properties in a camera system is considered.

Camera systems using a terahertz wave include a passive camera system and an active camera system. The passive camera system is a system composed of a camera including a sensor that receives a terahertz wave emitted from a target object. The active camera system emits a terahertz wave to an observation target object and performs imaging using a reflected terahertz wave. Japanese Patent Application Laid-Open No. 2018-087725 discusses an active camera system using a terahertz wave.

SUMMARY OF THE DISCLOSURE

According to an aspect of the embodiments, a system includes a transmission unit configured to transmit a terahertz wave, a reception unit configured to receive the terahertz wave, and a lens unit provided in the reception unit. The system is placed in a passage. In a case where a first plane that intersects a forward direction of the passage and is a surface of an object, and a second plane that intersects the forward direction of the passage, includes the lens unit, and is at a position different from a position of the first plane are set, a first area to which the terahertz wave from the transmission unit reflected from the first plane is emitted and the lens unit are disposed at positions different from each other on the second plane.

Further features of the disclosure will become apparent from the following description of exemplary embodiments with reference to the attached drawings.

DESCRIPTION OF THE EMBODIMENTS

Figure 1A:
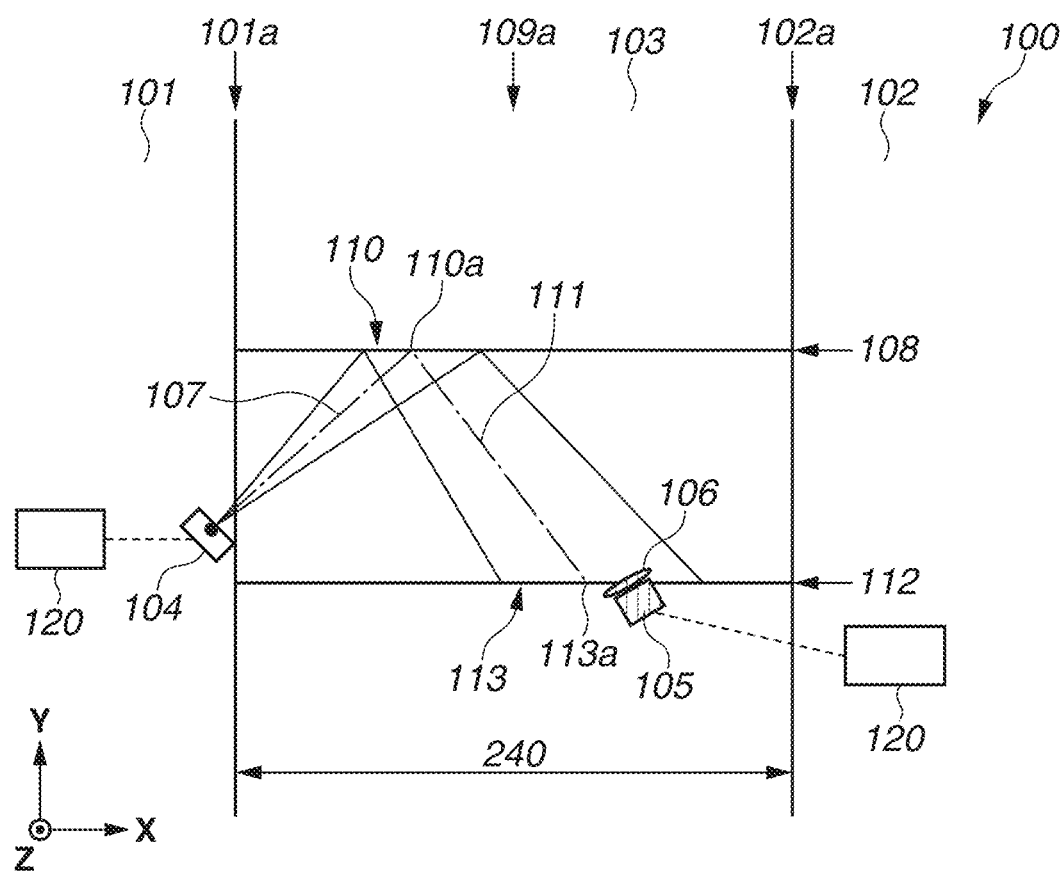
FIG. 1A is a schematic view illustrating a terahertz wave camera system according to a first exemplary embodiment.

With reference to the attached drawings, exemplary embodiments will be described in detail below. The following exemplary embodiments do not limit the disclosure. The exemplary embodiments can be appropriately combined together. Although a plurality of features is described in the exemplary embodiments, not all the plurality of features is essential for the disclosure, and the plurality of features may be optionally combined together. Further, in the attached drawings, the same or similar components are designated by the same reference numbers, and are not redundantly described.

A terahertz wave is described. Typically, the terahertz wave is a radio wave having any frequency band in the range from 0.1 THz to 30 THz. The terahertz wave has a wavelength longer than those of visible light and infrared light, therefore is unlikely to be influenced by scattering from an object, and has high transmission properties through many substances. The terahertz wave has a shorter wavelength than a millimeter wave and therefore enables high spatial resolution to be obtained. Making use of these features, the terahertz wave is expected to be applied to a safe imaging technique to replace an X-ray technique. Specifically, the imaging technique to which the terahertz wave is expected to be applied is a security check or a monitoring camera in a public place. A description will be given below of a terahertz wave camera system applicable to the security check or the monitoring camera to which the terahertz wave is expected to be applied.

With reference to FIGS. 1A, 1B, 2A, 2B, 8A, 8B, 9A, and 9B, a terahertz wave camera system 100 according to a first exemplary embodiment is described. First, a case is described where the camera system 100 is used in a security check or a monitoring camera.

When the present inventors observed the inside of clothes or packaging by transmitting light through the clothes or the packaging using an active camera system, the present inventors have found the following issue. The issue is that a terahertz wave reflected from the surface of the clothes or the packaging becomes noise and causes a decrease in the image quality of a terahertz image.

A security check or a monitoring camera is to image an object and confirm whether the object includes a concealed object under a covering object. For example, the covering object is clothes or packing, and the concealed object is a dangerous object such as a firearm or an explosive, an accessory or jewelry, or a small apparatus such as a smartphone. By detailed exploration, the present inventors have found that an image acquired by a terahertz wave camera system is an image in which images based on a plurality of reflected terahertz waves are superimposed on each other.

An electromagnetic wave including a terahertz wave has the following properties. If the electromagnetic wave is emitted to an uneven structure having a wavelength equal to or smaller than the wavelength of the electromagnetic wave, the electromagnetic wave is not scattered on the surface of the uneven structure, and is specularly reflected from the surface of the uneven structure. That is, for a certain electromagnetic wave, an uneven structure having a wavelength smaller than the wavelength of the electromagnetic wave can be a specular surface. Examples of the uneven structures are the uneven structure of the skin surface of a human body and the uneven structure of a metal surface. For example, the uneven structure of the skin surface of a human body or the uneven structure of a metal surface has a wavelength smaller than that of the terahertz wave. Thus, for the terahertz wave, the skin surface of a person or a metal surface can be a specular surface. A part of the terahertz wave is transmitted through a fabric material used for clothes or a packing material such as corrugated fiberboard or an envelope, and a part of the terahertz wave is reflected from the fabric material or the packaging material. Thus, in a case where a person who conceals a physical body under clothes as a covering object is observed using the terahertz wave, an image based on a reflected terahertz wave from the clothes, an image based on a reflected terahertz wave from the physical body, and an image based on a reflected terahertz wave from the person are superimposed on each other.

Figure 8A:
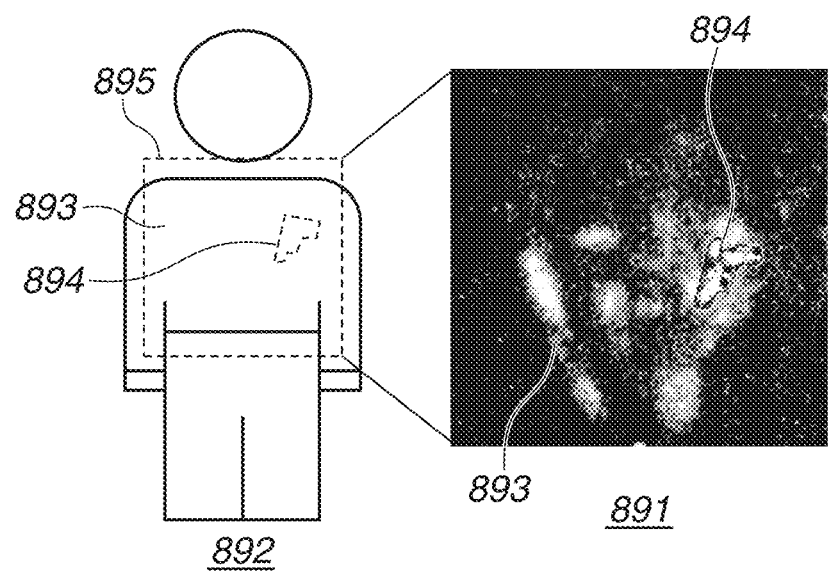
FIG. 8A is a schematic view illustrating the terahertz wave camera system according to the first exemplary embodiment.

FIG. 8A is an image diagram illustrating the state where a plurality of terahertz wave reflected images is superimposed on each other, and for describing the present exemplary embodiment. An object 892 is a person who has a physical body (e.g., a concealed object 894) under a covering object 893. In this case, the area 893 is an imaged area, and an image 891 is obtained as a terahertz image. The image 891 is an image in which an image derived from the covering object 893, an image derived from the concealed object 894, and an image derived from the skin surface of the person are superimposed on each other. If attention is paid to the concealed object 894, images other than the image of the concealed object 894 are superimposed on the image of the concealed object 894, and therefore, it may be difficult to identify the concealed object 894.

Figure 9A:
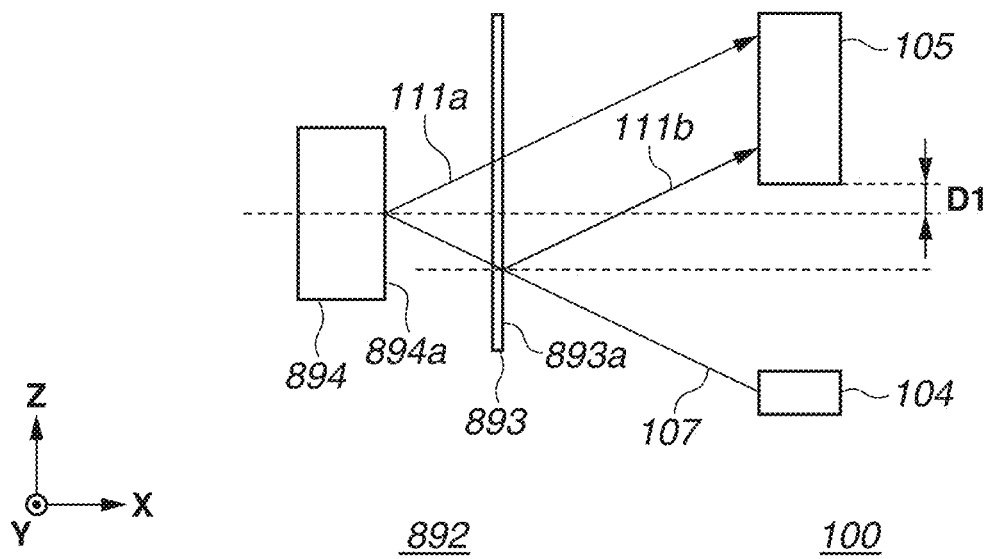
FIG. 9A is a schematic view illustrating the terahertz wave camera system according to the first exemplary embodiment.

FIG. 9A is a schematic view illustrating the state where a plurality of terahertz wave reflected images is superimposed on each other, and for describing the present exemplary embodiment. FIG. 9A illustrates an example of a case where reflected images are superimposed on each other. FIG. 9A illustrates the object 892, a transmission unit 104, and a reception unit 105.

As illustrated in FIG. 8A, the object 892 includes the concealed object 894 and the covering object 893. As illustrated in FIG. 9A, in an X-direction, the covering object 893 is located between the concealed object 894 and the transmission unit 104. In FIG. 9A, a terahertz wave 107, a reflected terahertz wave 111a, and a reflected terahertz wave 111b indicate the directional axes of the respective terahertz waves. The directional axes of the terahertz waves will be described below.

As illustrated in FIG. 9A, the transmission unit 104 emits the terahertz wave 107. Much of the terahertz wave 107 is transmitted through the covering object 893 and reflected from a surface 894a of the concealed object 894. A part of the terahertz wave 107 is reflected from a surface 893a of the covering object 893. The terahertz wave 107 becomes the reflected terahertz waves 111a and 111b, and the reflected terahertz waves 111a and 111b are detected by the reception unit 105. The terahertz wave 107 is not limited to a terahertz wave all of which is reflected and transmitted, and a part of the terahertz wave may be reflected and transmitted. A part of the terahertz wave 107 may attenuate, or may be absorbed by the covering object 893 or the concealed object 894.

Terahertz waves received by the reception unit 105 are the reflected terahertz waves 111a and 111b. The reflected terahertz wave 111a includes information regarding the concealed object 894. The reflected terahertz wave 111b includes information regarding the covering object 893. If the reception unit 105 is provided at the position where the reception unit 105 can receive these two reflected terahertz waves, the image 891 is an unclear image including information as noise such as the covering object 893. To acquire an image paying attention to the concealed object 894, the reception unit 105 should receive the reflected terahertz wave 111a. In one embodiment, the reception unit 105 should receive only the reflected terahertz wave 111a.

Figure 9B:
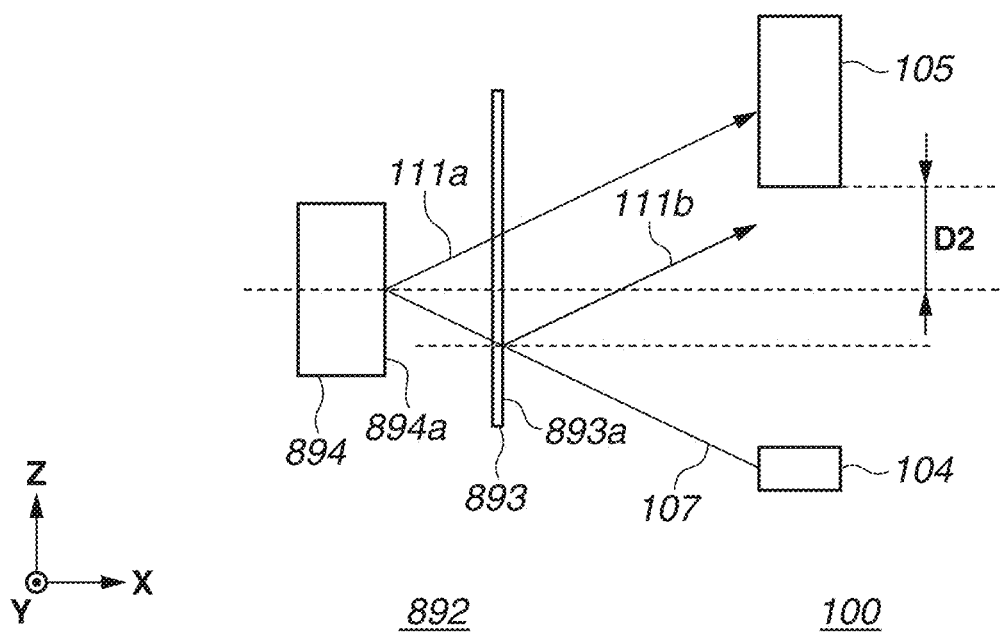
FIG. 9B is a schematic view illustrating the terahertz wave camera system according to the first exemplary embodiment.

FIG. 9B is a schematic view for describing the present exemplary embodiment and corresponds to FIG. 9A. In FIG. 9B, the position of the reception unit 105 is shifted from the position illustrated in FIG. 9A. For illustrative purposes, a case is described where the reception unit 105 is shifted in a Z-axis direction as a certain single direction. In one embodiment, the reception unit 105 is shifted only in a Z-axis direction as a certain single direction. The reception unit 105 is thus placed, whereby the unwanted reflected terahertz wave 111b received by the reception unit 105 is reduced. Thus, it is possible to acquire an image with less noise. In the description, the reception unit 105 is moved in a single direction. In one embodiment, the reception unit 105 is moved only in a single direction. The disclosure, however, is not limited to this. The reception unit 105 can be moved in any direction.

A more detailed description is given. In FIG. 9A, the reception unit 105 is located away from the center line (a dotted line) of the concealed object 894 by a distance D1 in the Z-axis direction. On the other hand, in FIG. 9B, the reception unit 105 is located away from the center line (a dotted line) of the concealed object 894 by a distance D2 in the Z-axis direction. In this case, the distance D1<the distance D2. The reception unit 105 is placed to reduce the unwanted reflected terahertz wave 111b received by the reception unit 105, whereby it is possible to acquire an image with less noise.

Figure 8B:
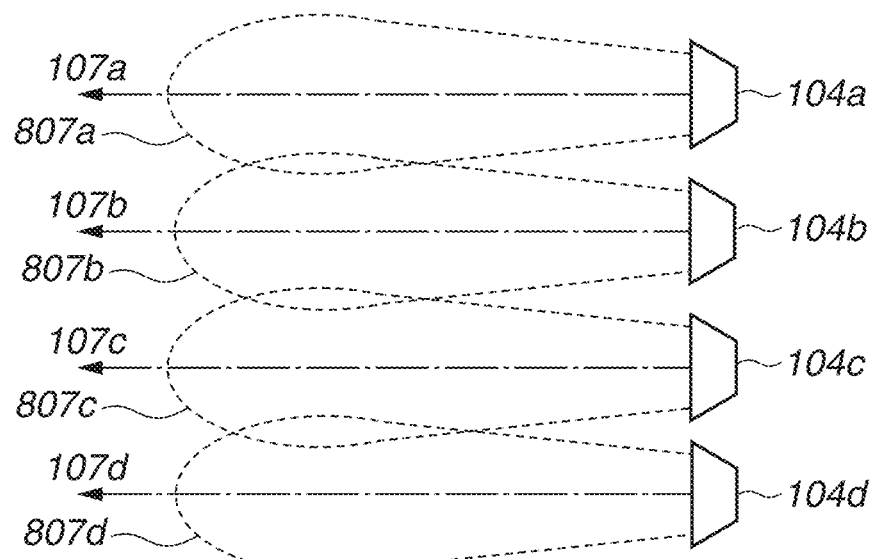
FIG. 8B is a schematic view illustrating the terahertz wave camera system according to the first exemplary embodiment.

Terahertz waves are described. The terahertz waves are electromagnetic waves having spreads as illustrated in FIG. 8B. FIG. 8B illustrates a plurality of transmission units 104a to 104d and terahertz waves 807a to 807d emitted from the plurality of transmission units 104a to 104d, respectively. The terahertz waves 807a to 807d indicate beam patterns. The beam patterns are also referred to as "emission patterns". The transmission unit 104a emits the terahertz wave 807a, and the transmission unit 104b emits the terahertz wave 807b. The transmission unit 104c emits the terahertz wave 807c, and the transmission unit 104d emits the terahertz wave 807d. The directional axes of the terahertz waves 807a to 807d are indicated by terahertz waves 107a to 107d, respectively. As described above, the terahertz waves 107a and 107b illustrated in other figures indicate directional axes. A directional axis is the central axis of the directional characteristics of a terahertz wave from a transmission unit. For example, the directional axis is a straight line indicating the direction in which the terahertz wave having the highest intensity is emitted from the transmission unit. The directional axis can also be referred to as an "emission central axis". For example, the directional axis can be obtained as follows. A plurality of concentric spheres centered at the center of gravity of the transmission unit and having different radii is created. Then, the position where the terahertz wave has high intensity is determined on each spherical surface, and these positions are connected together, whereby the directional axis can be obtained. Alternatively, the directional axis can also be obtained by simulation. The terahertz waves 807a to 807d adjacent to each other may be partially superimposed on each other.

Figure 1B:
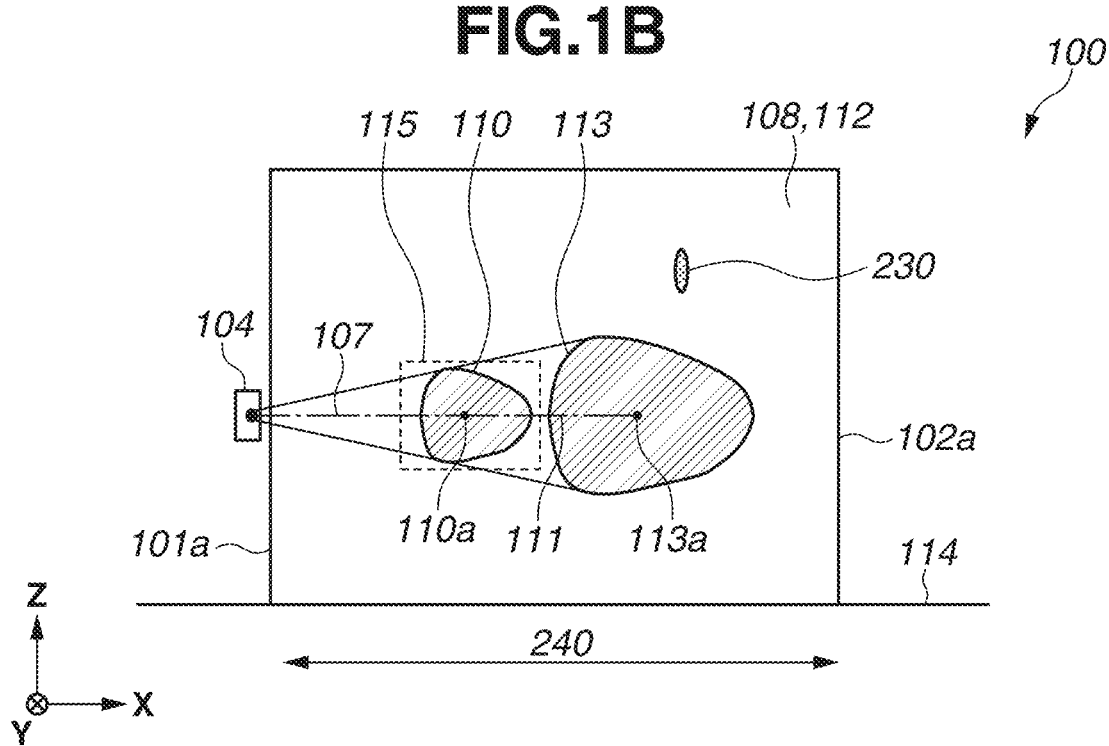
FIG. 1B is a schematic view illustrating the terahertz wave camera system according to the first exemplary embodiment.
Figure 2A:
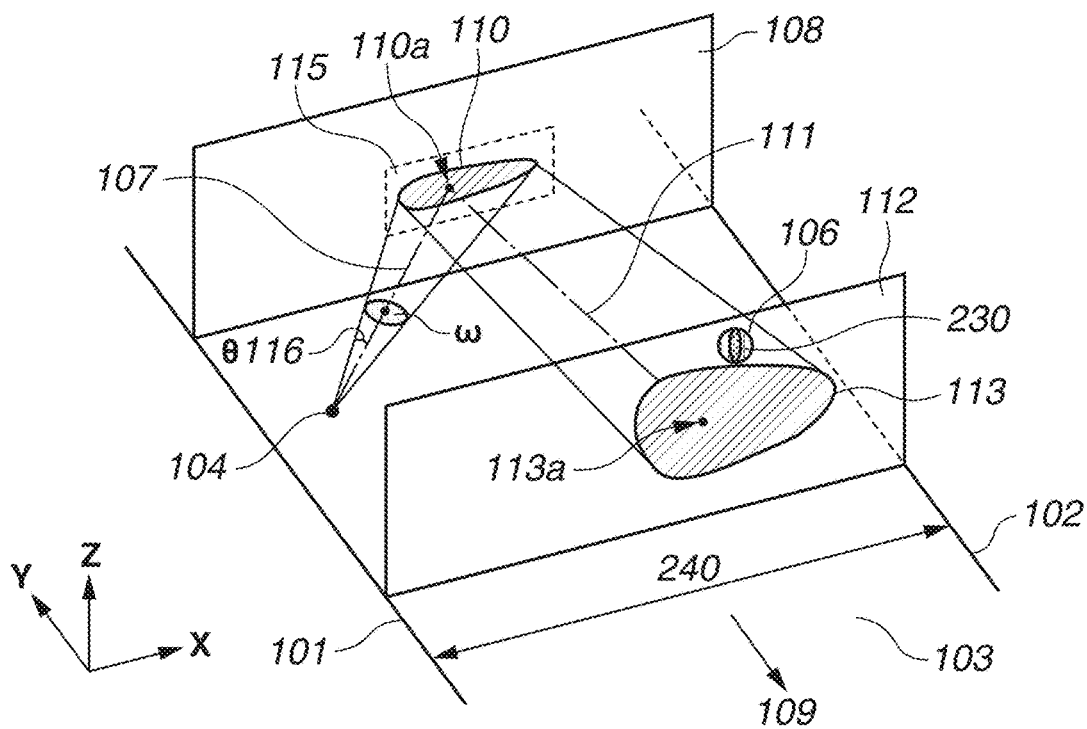
FIG. 2A is a schematic view illustrating the terahertz wave camera system according to the first exemplary embodiment.
Figure 2B:
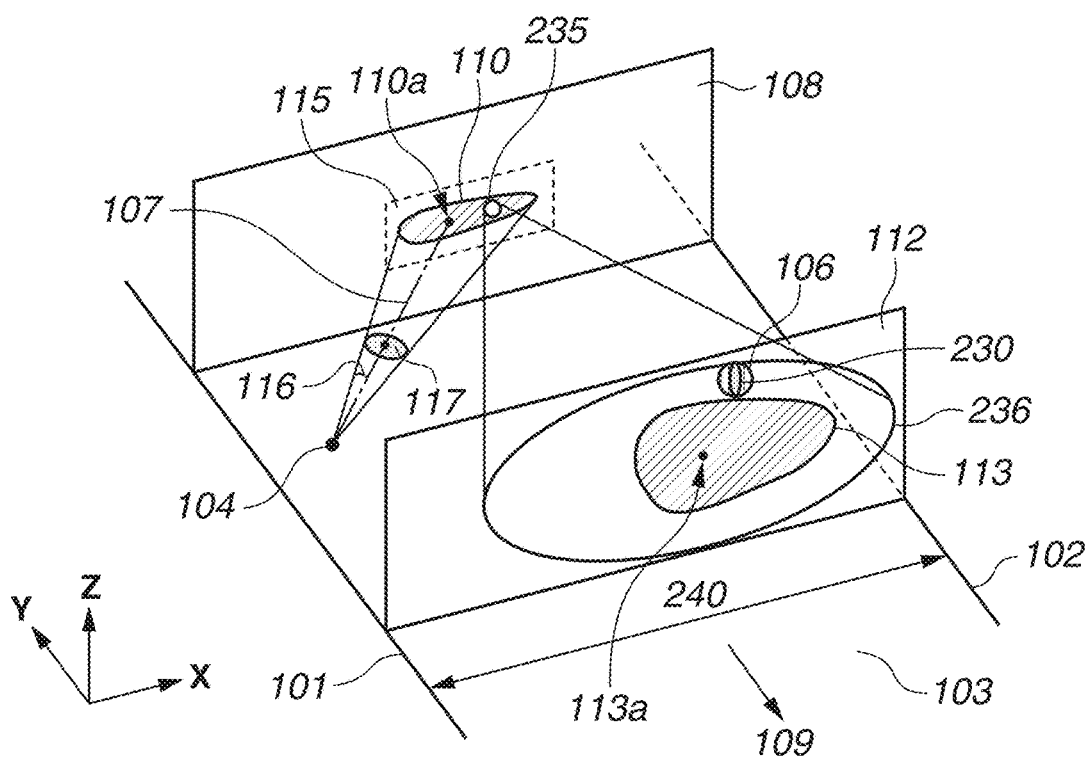
FIG. 2B is a schematic view illustrating the terahertz wave camera system according to the first exemplary embodiment.

The camera system 100 according to the present exemplary embodiment is specifically described. FIGS. 1A, 1B, 2A, and 2B are schematic views illustrating the camera system 100. FIG. 1A is a schematic top view of the camera system 100 and is also a schematic view where members are projected onto a plane parallel to a plane including an X-axis and a Y-axis, and orthogonal to a Z-axis. FIG. 1B is a schematic front view of the camera system 100 and is also a schematic view where the members and areas are projected onto a plane parallel to a plane including the X-axis and the Z-axis, and orthogonal to the Y-axis. FIG. 1B can also be said to be a schematic projection view of the members viewed in the Y-axis direction. FIG. 2A is a schematic perspective view. FIG. 2B is a schematic perspective view corresponding to FIG. 2A and is a schematic view illustrating a case where a certain physical body is imaged. Although the following description will be given with reference to each figure, FIGS. 1A to 2B will be cross-referenced. Each figure will occasionally omit a component that is not used in the description of the figure.

The camera system 100 includes a transmission unit 104 and a reception unit 105. The camera system 100 further includes a lens unit 106 and a control unit 120. The transmission unit 104 emits a terahertz wave 107. The reception unit 105 receives a reflected terahertz wave 111 based on the terahertz wave 107. The camera system 100 is an active terahertz wave camera system.

The camera system 100 is installed in a passage 103. The passage 103 is formed between areas 101 and 102. A portion between the area 101 and the passage 103 is defined as a boundary 101a, and a portion between the area 102 and the passage 103 is defined as a boundary 102a. For example, each of the areas 101 and 102 can be a rope, a fence, a wall, a ticket gate, or a gate for composing the passage 103. For example, each of the boundaries 101a and 102a can be a line drawn on a floor, the surface of the wall, or the side surface of the fence, the ticket gate, or the gate. It is assumed that an observation target such as a person or an inspection object, i.e., an object, passes through the passage 103. The forward direction of the passage 103 is a direction 109. The forward direction 109 of the passage 103 is a line connecting points at equal distances on line segments connecting the boundaries 101a and 102a. The passage 103 has a width 240. The width 240 is a line segment connecting the boundaries 101a and 102a.

In FIGS. 1A to 2B, the transmission unit 104 is illustrated as a point light source. Alternatively, the transmission unit 104 may be a surface light source or a set of a plurality of point light sources. The transmission unit 104 emits a terahertz wave selected in the frequency range of 0.1 THz or more and 30 THz or less, in one embodiment, the frequency range 0.1 THz or more and 10 THz or less. The transmission unit 104 can be composed of a resonant circuit using a semiconductor element having negative resistance, and a multiplier. The semiconductor element having negative resistance is a resonant-tunneling diode (RTD), an IMPact ionization Avalanche Transit-Time (IMPATT) diode, or a Gunn diode. In the present exemplary embodiment, an RTD is used as the transmission unit 104. In the RTD, a terahertz wave having a frequency of 0.3 THz and a wavelength of about 1 mm is generated. The terahertz wave is emitted using an antenna.

The reception unit 105 can be composed of a bolometer array having sensitivity to a terahertz wave, or an antenna array including a detector circuit such as a rectifier circuit. For example, a bolometer is an element that converts a terahertz wave into heat and detects the heat as a change in a resistance value. An antenna is a reception element including a patch antenna or a loop antenna, and a rectifier circuit or a detector circuit such as a Schottky barrier diode. In the reception unit 105, these reception elements are disposed two-dimensionally. The reception unit 105 also includes a circuit for outputting a signal. For example, the reception unit 105 can output 50 pieces of two-dimensional signal information per second.

The lens unit 106 is installed in the reception unit 105 and can collect light of a terahertz wave. The lens 106 can be composed of an inorganic material such as silicon or germanium, which excellently transmits a terahertz wave, or an organic material such as polyethylene. The lens 106 can be designed using a method similar to that used in the general visible light range. The lens unit 106 may have a focus function. The focus of the lens unit 106 is located at the reception elements of the reception unit 105 and adjusted to form an image on the reception elements.

For example, the control unit 120 supplies a control signal to the transmission unit 104. For example, the control unit 120 can control a reception operation of the reception unit 105 and acquire a signal based on a terahertz wave received by the reception unit 105. The control unit 120 may be a physically single apparatus, or may be composed of a plurality of apparatuses including an apparatus corresponding to the transmission unit 104 and an apparatus corresponding to the reception unit 105.

With reference to FIGS. 1A to 2B, the placement of the camera system 100 is described. First, the transmission unit 104 is disposed outside the passage 103, and the reception unit 105 is disposed inside the passage 103. In other words, in FIG. 1A, the transmission unit 104 is disposed in the area 101, and the reception unit 105 is disposed in the passage 103. The placement of the transmission unit 104 and the reception unit 105 merely illustrates a part of the concept of the disclosure, and can be changed in various ways.

The placement is described using a plurality of planes 108 and 112. A plane 108 in FIG. 1A is a virtual plane, intersects the direction 109, and is placed at any location in the passage 103. The plane 108 indicates the surface of the object. A plane 112 in FIG. 1A intersects the direction 109 and is placed to intersect the lens unit 106. The plane 112 can also be said to be a plane including the lens unit 106. A plane 114 in FIG. 1B is, for example, a floor. The planes 108 and 112 are parallel to each other, orthogonal to the boundaries 101$a$ and 102$a$, and orthogonal to the direction 109. The boundaries 101$a$ and 102$a$ are perpendicular to the plane 114. The planes 108 and 112 are perpendicular to the plane 114. The relationships among these planes and boundaries are not limited to perpendicular, orthogonal, or parallel, and can be appropriately changed.

First, with reference to FIG. 1A, a description is given. The transmission unit 104 emits the terahertz wave 107. The terahertz wave 107 illustrated in FIG. 1A is the directional axis of the terahertz wave 107. A terahertz wave 117 indicates the emission pattern of the terahertz wave 107. The terahertz wave 107 is emitted toward the plane 108 and reflected from the plane 108. That is, the terahertz wave 107 is emitted toward the object and reflected from the surface of the object. An area on the plane 108 to which the terahertz wave 107 is emitted is defined as an area 110. The reflected terahertz wave 107 becomes the reflected terahertz wave 111. The reflected terahertz wave 111 illustrated in FIG. 1A is the directional axis of the terahertz wave 111. The terahertz wave 111 indicates the emission pattern of the reflected terahertz wave 111. An area on the plane 112 to which the terahertz wave 111 is emitted is defined as an area 113. The lens unit 106 also seems located on the plane 112 and included in the area 113.

In the present exemplary embodiment, the transmission unit 104 is placed such that the terahertz wave 107 emitted from the transmission unit 104 is incident as a P wave on the plane 108. For example, the transmission unit 104 is disposed such that the terahertz wave 107 has a polarization plane in a direction parallel to the plane 114. The terahertz wave 107 is incident as the P wave on the plane 108, whereby, in a case where an object 205 is a person, it is possible to reduce or minimize reflection from clothes worn by the person. If the incident angle of the terahertz wave 107 matches Brewster's angle determined based on the refractive index of the clothes, reflection from the clothes completely disappears. This makes it easy to image a foreign substance hidden under the clothes of the person as the object 205.

With reference to FIG. 2A, the terahertz wave 107 and the reflected terahertz wave 111 are described. The terahertz wave 107 is a directional axis corresponding to the direction in which the terahertz wave 107 has the highest intensity in the emission pattern. The terahertz wave 117 is a line segment indicating the emission pattern and is a line segment connecting the outer edge of a solid angle ω formed by a half-value angle θ116 between the direction in which the terahertz wave 107 has the half value of the intensity in the directional axis, and the directional axis. In this case, the incident angle between the terahertz wave 107 and the plane 108 and the reflection angle between the reflected terahertz wave 111 and the plane 108 are equal to each other. That is, the terahertz wave 107 is specularly reflected from the plane 108.

With reference to FIG. 1B, the positional relationships among the areas and the components are described. FIG. 1B is a projection view of the components viewed in the Y-axis direction. The terahertz wave 107 is emitted from the transmission unit 104 to the plane 108 and forms the area 110. A point 110$a$ is the position of the terahertz wave 107 on the plane 108 and is the position where the terahertz wave 107 can have high intensity. The terahertz wave 107 is specularly reflected from the plane 108, is emitted to the plane 112, and forms the area 113. A point 113$a$ is the position of the reflected terahertz wave 111 on the plane 112 and is the position where the reflected terahertz wave 111 can have high intensity. An area 115 indicates a range that can be detected by the reception unit 105. The area 110 is set to include a part of the area 115. The plane 112 is provided to include the lens unit 106. An area 230 is an area where the plane 112 intersects the lens unit 106.

As illustrated in FIG. 1B, the area 230 does not include at least the point 113$a$. That is, the lens unit 106 is placed so as not to include the point 113$a$ of the reflected terahertz wave 111. With such placement, it is possible to reduce the reflected terahertz wave 111 received by the reception unit 105 and including information regarding a covering object located on the surface of the object. Thus, it is possible to acquire an image in which noise is reduced. Further, the area 230 is not superimposed on the area 113. It can also be said that the area 113 does not include the area 230. The lens unit 106 is placed so as not to include an area where the reflected terahertz wave 111 has high intensity. With such placement, it is possible to reduce the reflected terahertz wave 111 received by the reception unit 105 and including information regarding a covering object located on the surface of the object. Thus, it is possible to acquire an image in which noise is further reduced. The distance between the transmission unit 104 and the reception unit 105 is 0.25 m or more and 3.0 m or less, in one embodiment, 0.50 m or more and 2.0 m or less.

Although not described in detail, a method for designing the camera system 100 is as follows. The position and the direction at and in which the transmission unit 104 is provided, and the position and the direction at and in which the reception unit 105 is provided are appropriately selected in any passage or apparatus. The planes 108 and 112 are temporarily provided, and the trajectory of the reflected terahertz wave 111 is simulated. Then, the positions and the directions of the transmission unit 104 and the reception unit 105 are adjusted so that the reception unit 105 and an area formed by the reflected terahertz wave 111 are not superimposed on each other on the plane 112. By such a technique, it is possible to design a suitable camera system 100.

FIG. 2B illustrates a case where an object is provided in FIG. 2A. In the present exemplary embodiment, the object is an observation substance 235 having a three-dimensional shape. The observation substance 235 is drawn as being spherical, but can have any shape. The observation substance 235 is located inside the area 110 and located inside the area 115.

The terahertz wave 107 is reflected from the observation substance 235 and forms an area 236 on the plane 112. The reason why the area 236 has a shape different from that of the area 113 is that the observation substance 235 has a three-dimensional shape. The area 230 is superimposed on the area 236, and is not superimposed on at least the point 113$a$. Further, the area 230 is superimposed on the area 236, and is not superimposed on the area 113. That the area 230 is superimposed on the area 236 means that an image of the observation substance 235 can be acquired by the reception unit 105. The area 230 is not superimposed on at least the point 113a, whereby it is possible to reduce information as noise. For example, in a case where the plane 108 is a covering object such as a fabric, the reflected terahertz wave 111 from the fabric is not detected by the reception unit 105, and an image of the observation substance 235 can be acquired. In one embodiment, only the image of the observation substance 235 can be acquired.

The angle between the terahertz wave 107 emitted from the transmission unit 104 and the plane 108 and the angle between the optical axis of the lens unit 106 and the plane 108 are different in size from each other. With such a configuration, it is possible to prevent the areas 113 and 230 from being superimposed on each other.

The plane 108 is described in detail. First, as described above, the plane 108 is provided perpendicular to the plane 114 in FIG. 1B and perpendicular to the direction 109. Such a setting is effective in a case where there is a high probability that an object passing through the passage 103 includes a plane approximately parallel to the plane 108.

For example, in a case where a person passes through the passage 103, the surface of the person is composed of curved planes, but can be regarded as averagely a plane parallel to the plane 108. Planes composing the surface of the person averagely include a high proportion of planes parallel to the plane 108. A concealed object covered by belongings or clothes has a shape different from that of a human body and therefore often includes a plane having a perpendicular in a direction different from that of the plane 108. A terahertz wave reflected from such a plane can be detected by the detection unit 105. Thus, the setting of the plane 108 can be applied also in a case where a person passes through the passage 103. Thus, it is possible to prevent the camera system 100 from receiving much of a reflected terahertz wave from the surface of a person or the surface of clothes. That is, the camera system 100 can acquire an image in which noise is reduced.

For example, in a case where an inspection object such as an envelope passes through the passage 103, the surface of the envelope can be regarded as averagely a plane parallel to the plane 108. Thus, the setting of the plane 108 can be applied also in such a case. Thus, it is possible to prevent the camera system 100 from receiving much of a reflected terahertz wave from the surface of an envelope. That is, the camera system 100 can acquire an image in which noise is reduced.

Next, the plane 108 is further described. In one embodiment, the plane 108 is set in the range where the lens unit 106 can come into focus also in the passage 103. The plane 108, however, may be set outside the range where the lens unit 106 comes into focus. The angle between the plane 108 and the direction 109 may be adjusted. The setting of the half-value angle θ116 can also be changed from the half value to 1/e (e: Napier's constant). Adjustment can be performed according to the type of the object.

A terahertz wave emitted from the transmission unit 104 is described. As described above, the terahertz wave emitted from the transmission unit 104 may have a polarized wave. In this case, the terahertz wave may be incident as a P wave on the plane 108, i.e., a plane equivalent to the surface of the object 205. The terahertz wave is incident as the P wave on the plane 108, whereby it is possible to reduce or minimize a reflected terahertz wave on the surface.

Further, the terahertz wave emitted from the transmission unit 104 may have a plurality of polarized waves different in polarization direction from each other. Alternatively, the terahertz wave emitted from the transmission unit 104 may have at least either of a linearly polarized wave and a circularly polarized wave. The terahertz wave may be incident as a P wave and an S wave on the plane 108, or may be incident alternately as the P wave and the S wave on the plane 108. With such a configuration, in a case where the object 205 is a person who wears clothes, the following effect is obtained. An image acquired using the S wave includes many components regarding a covering object such as the clothes. An image acquired using the P wave includes many components regarding a concealed object under the covering object such as the clothes. Both the image acquired using the S wave and the image acquired using the P wave are used, whereby it is possible to extract the concealed object of the object 205. Using both images means image processing for appropriately performing a combining process or a subtraction process.

Figure 11:
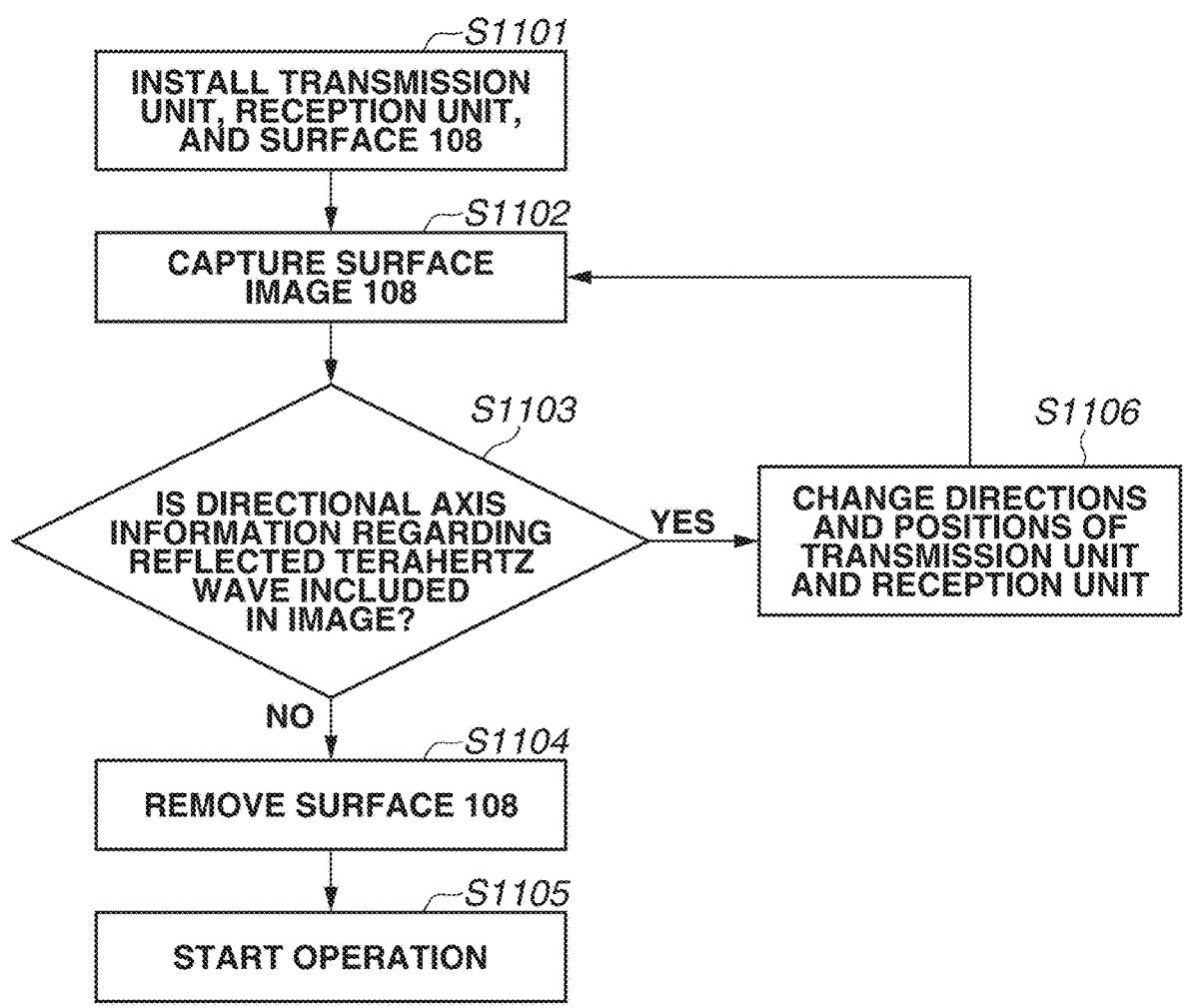
FIG. 11 is a flowchart illustrating a method for controlling the terahertz wave camera system according to the first exemplary embodiment.

With reference to FIG. 11, a control method for controlling the camera system 100 is described. FIG. 11 is a flowchart illustrating the control method. In step S1101, the transmission unit 104, the reception unit 105, and the plane 108 are installed. The positions and the directions of the transmission unit 104, the reception unit 105, and the plane 108 are set to any positions and any directions. In step S1102, a terahertz wave is emitted from the transmission unit 104 toward the plane 108, and a reflected terahertz wave is received by the reception unit 105. A signal output from the reception unit 105 is processed by the control unit 120 (see FIG. 1A). As the processing, in step S1103, it is determined whether directional axis information regarding the reflected terahertz wave is included in an image. That the directional axis information is included in the image means that information based on an area formed by the directional axis of the reflected terahertz wave on the plane 112 is received. If the directional axis information is included (YES in step S1103), the processing proceeds to step S1106. In step S1106, at least one of the positions and the directions of the transmission unit 104 and the reception unit 105 is changed. Then, the processing returns to step S1102. If the directional axis information is not included (NO in step S1103), the processing proceeds to step S1104. In step S1104, the plane 108 is removed. In step S1105, an operation such as actual image capturing is started. The change in the position or the direction in step S1106 can be achieved by mounting driving units in the transmission unit 104 and the reception unit 105 and by the control unit 120 supplying a control signal for controlling the operation of each driving unit. To the driving units, a technique used in a visible light monitoring camera can be applied.

Figure 10A:
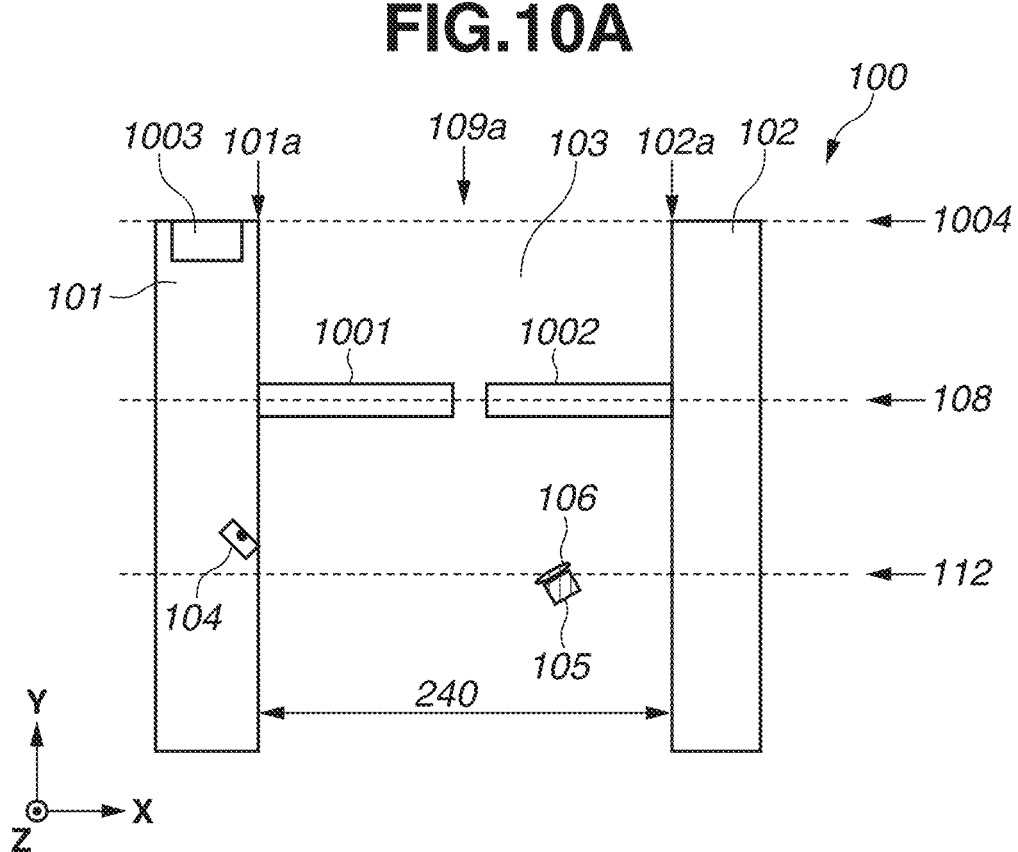
FIG. 10A is a schematic view illustrating a variation of the terahertz wave camera system according to the first exemplary embodiment.
Figure 10B:
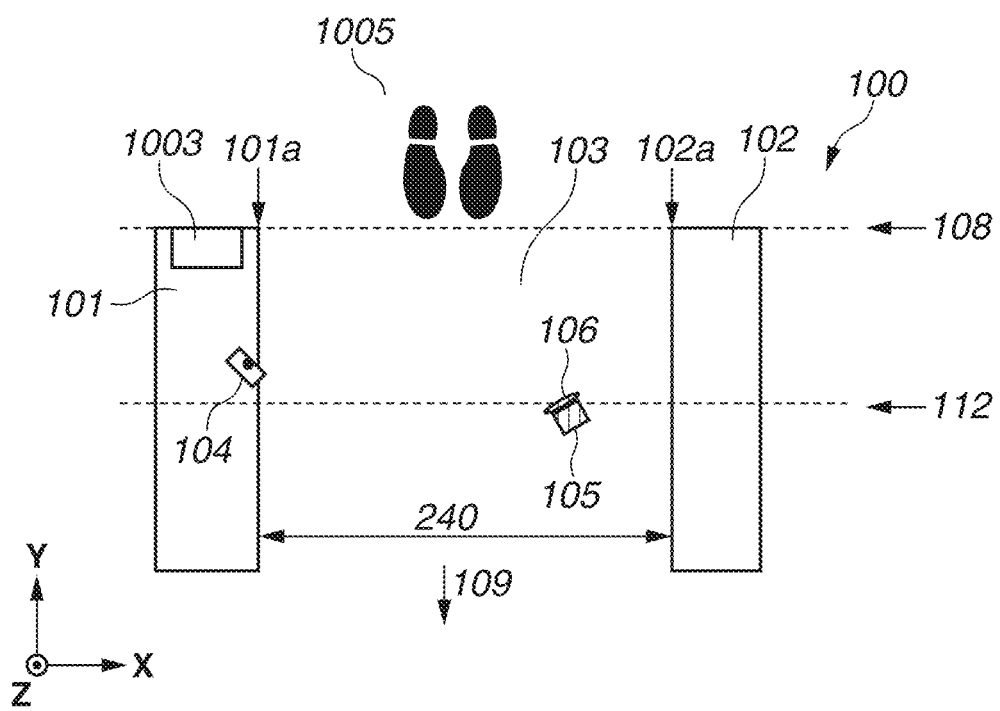
FIG. 10B is a schematic view illustrating a variation of the terahertz wave camera system according to the first exemplary embodiment.

Next, with reference to FIGS. 10A and 10B, a variation of the camera system 100 is described. First, FIG. 10A is a schematic view corresponding to FIG. 1A. In FIG. 10A, components other than the main portion of FIG. 1A are omitted. The passage 103 in FIG. 10A is an entry/exit management apparatus such as a ticket gate or an entry/exit gate. The areas 101 and 102 are walls, and gates 1001 and 1002 are provided on the walls. On one of the walls, a management unit 1003 is provided that manages entry and exit. The management unit 1003 is a card detector, a fingerprint sensor, a vein sensor, or a face authentication system. The plane 108 can be installed at any position from a position superimposed on the gates 1001 and 1002 to an end portion of the passage 103. For example, the plane 108 may be a plane 1004 as the end portion of the passage 103.

FIG. 10B is a schematic view corresponding to FIG. 1A. In FIG. 10B, components other than the main portion of FIG. 1A are omitted. The passage 103 in FIG. 10B is an entry/exit management apparatus such as an entry/exit gate.

For example, the entry/exit gate can be an automatic door or a door. The areas 101 and 102 are walls. On one of the walls, a management unit 1003 is provided that manages entry and exit. The management unit 1003 is a card detector, a fingerprint sensor, a vein sensor, or a face authentication system. The plane 108 is located at an end portion of the passage 103. An object stops at a stop position indicated by footmarks 1005, and therefore, it is easy to image the object on the plane 108. The plane 108 may coincide with an end portion of the footmarks 1005. To such a location or apparatus, the camera system 100 according to the present exemplary embodiment can be applied.

Figure 3A:
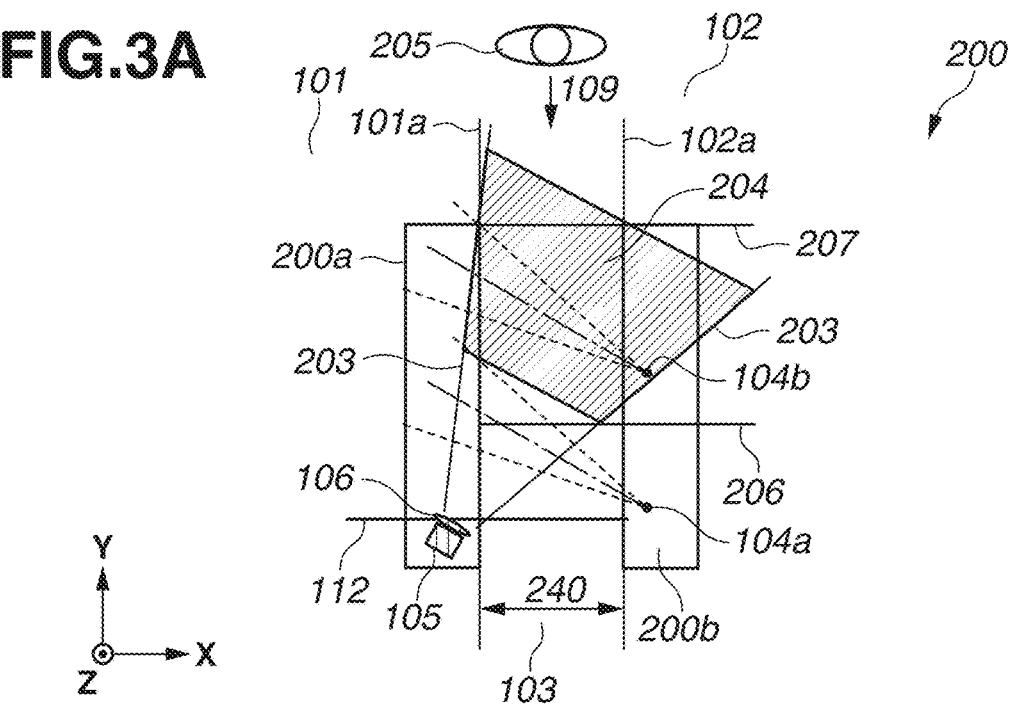
FIG. 3A is a schematic view illustrating a terahertz wave camera system according to a second exemplary embodiment.
Figure 3B:
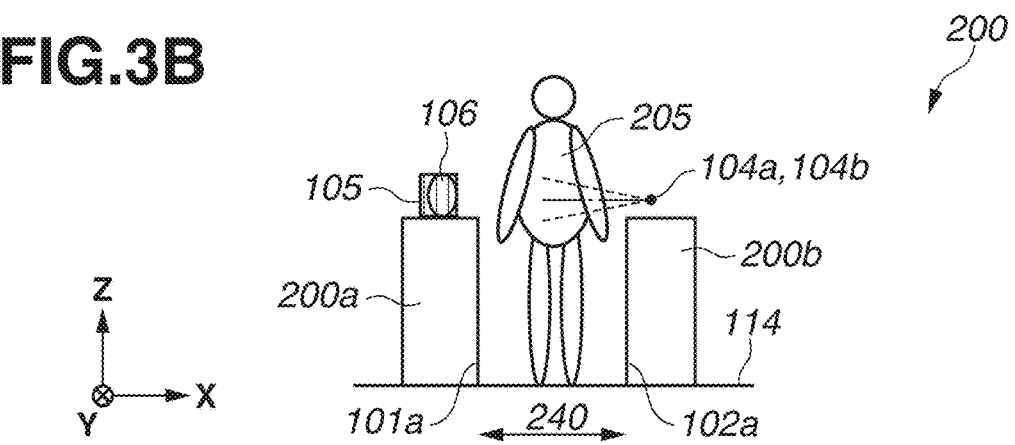
FIG. 3B is a schematic view illustrating the terahertz wave camera system according to the second exemplary embodiment.
Figure 3C:
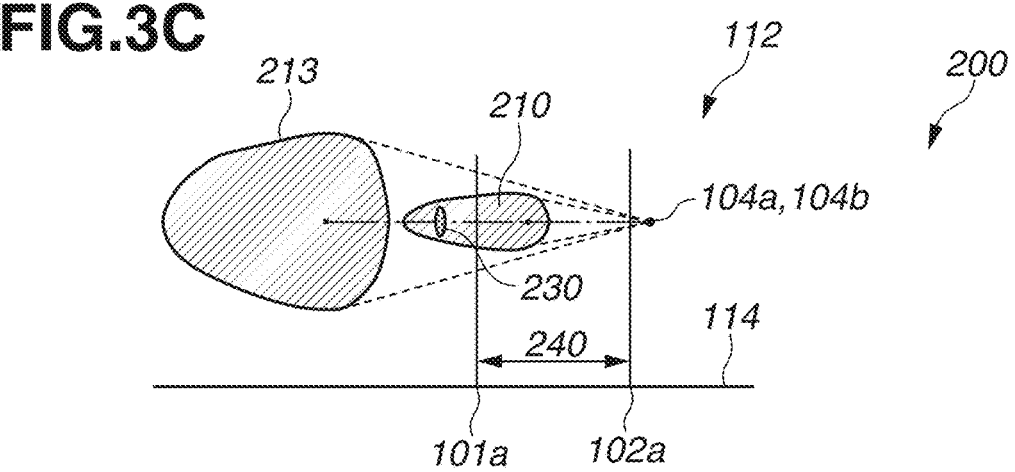
FIG. 3C is a schematic view illustrating the terahertz wave camera system according to the second exemplary embodiment.

With reference to FIGS. 3A and 3B, a terahertz wave camera system 200 according to a second exemplary embodiment is described. The present exemplary embodiment is different from the first exemplary embodiment in that a plurality of transmission units 104 is provided. FIG. 3A is a schematic top view of the camera system 200 and is also a schematic view illustrating a case where members and areas are projected onto a plane parallel to a plane including an X-axis and a Y-axis, and orthogonal to a Z-axis. FIG. 3B is a schematic front view of the camera system 200 and is a schematic view viewed in the Y-axis direction. FIG. 3C is a schematic view illustrating a case where the members and the areas are projected onto a plane, such as a plane 112, parallel to a plane including the X-axis and the Z-axis, and orthogonal to the Y-axis. FIG. 3C can also be said to be a schematic projection view of the members and the areas viewed in the Y-axis direction. In the following description, FIGS. 3A to 3C can be cross-referenced. Each figure will occasionally omit a component that is not used in the description of the figure. In FIGS. 3A to 3C, components described with reference to FIGS. 1A to 2B are not described.

FIGS. 3A and 3B illustrate a case where an object 205 passes through a passage 103. The passage 103 is provided between boundaries 101a and 102a. A base 200a for composing the passage 103 is provided in an area 101, and a base 200b for composing the passage 103 is provided in an area 102. On the base 200a, a reception unit 105 and a lens unit 106 are disposed. On the base 200b, transmission units 104a and 104b are disposed. As compared with the first exemplary embodiment, the positions of the transmission unit 104 and the reception unit 105 are switched with respect to the passage 103, but the configuration is not changed.

An area 204 in FIG. 3A is within the range of an angle of view 203 of the lens unit 106, and is the range where the lens unit 106 comes into focus. The area 204 may be the range of the depth of field of the lens unit 106, or may be the range where the lens unit 106 can perform autofocus. In the present exemplary embodiment, the distance of the area 204 from the reception unit 105 is assumed to be 0.50 m or more and 3.0 m or less. An image is captured in the area 204.

A plane 206 is equivalent to the plane 108 in the first exemplary embodiment, is located in the passage 103, and is located on the area 204. Similarly to the plane 206, a plane 207 is equivalent to the plane 108 in the first exemplary embodiment, is located in the passage 103, and is located in the area 204. The planes 206 and 207 are planes perpendicular to a plane 114 and are perpendicular to a direction 109. For example, the object 205 passing through the passage 103 is a person. As described in the first exemplary embodiment, the surface of the person has many components regarding a plane perpendicular to the front direction of the person, i.e., the direction 109. Thus, in one embodiment, the planes 206 and 207 should be planes perpendicular to the plane 114 and should be perpendicular to the direction 109 in the passage 103. As a matter of course, it is possible to adjust the angle between the planes 206 and 207 according to the object 205.

The directional axis of a terahertz wave emitted from the transmission unit 104a and the directional axis of a terahertz wave emitted from the transmission unit 104b are parallel to the plane 114. The aspect of the embodiments, however, is not limited to this.

A width 240 of the passage 103 is an important value for restricting the motion of the object 205 and determining the direction 109. In the present exemplary embodiment, a case is assumed where the object 205 is a person. However, in view of a case where a wheelchair or a stroller is used or a plurality of people passes through the passage 103, the width 240 can range from 0.5 m or more to 3 m or less.

For example, a case is described where the object 205 located on the plane 206 is imaged. A terahertz wave is emitted from the transmission unit 104a toward the plane 206. A terahertz wave reflected from the plane 206 is emitted to the plane 112. Similarly to the first exemplary embodiment, the positional relationship between an area formed by the reflected terahertz wave on the plane 112 and the lens unit 106 on the plane 112 is adjusted, whereby it is possible to reduce noise. Similarly to FIG. 1B, FIG. 3C is a schematic view where the areas are projected onto the plane 112. FIG. 3C illustrates an area 210 formed on the plane 206 by the terahertz wave, an area 213 formed on the plane 112 by the reflected terahertz wave, and an area 230. The area 230 is not superimposed on a point 213a, and the area 230 is not superimposed on the area 213. The positions of the reception unit 105 and the transmission unit 104a and the direction of the directionality of the terahertz wave emitted from the transmission unit 104a are thus adjusted, whereby it is possible to reduce noise.

A case where the object 205 located on the plane 207 is imaged is similar to the case of the plane 206. The positions of the reception unit 105 and the transmission unit 104b and the direction of the directionality of a terahertz wave emitted from the transmission unit 104b are adjusted, whereby it is possible to reduce noise. The same applies to a case where terahertz waves are emitted from both the transmission units 104a and 104b to any plane.

A terahertz wave emitted from the transmission unit 104a or 104b may have a polarized wave. In this case, the terahertz wave may be incident as a P-polarized wave on a plane equivalent to the surface of the object 205, such as the plane 206 or 207. The terahertz wave is incident as the P-polarized wave on the plane 206 or 207, whereby it is possible to reduce or minimize a reflected terahertz wave on the surface.

The terahertz wave emitted from the transmission unit 104a or 104b may have a plurality of polarized waves different in polarization direction from each other. Alternatively, the terahertz wave emitted from the transmission unit 104a or 104b may have a circularly polarized wave. The terahertz wave may be incident as a P-polarized wave and an S-polarized wave on the plane 206 or 207, or may be incident alternately as the P-polarized wave and the S-polarized wave on the plane 206 or 207. For example, in a case where the object 205 is a person who wears clothes, the following effect is obtained. An image acquired using the S-polarized wave includes many components regarding a covering object such as the clothes. An image acquired using the P-polarized wave includes many components regarding a concealed object under the covering object such as the clothes. Both the image acquired using the S-polarized wave and the image acquired using the P-polarized wave are used, whereby it is possible to extract the concealed object of the object 205. Using both images means image processing for appropriately performing a combining process or a subtraction process.

With reference to FIGS. 4A, 4B, 5A, and 5B, a terahertz wave camera system 300 according to a third exemplary embodiment is described. The present exemplary embodiment is different from the second exemplary embodiment in that the numbers of transmission units and reception units are increased, the positions of the reception units are changed, and the transmission units are provided on both sides of the passage 103. The camera system 200 according to the second exemplary embodiment includes a single reception unit 105 and observes a single side surface of the object 205. In one embodiment, the camera system 200 observes only a single side surface of the object 205. The camera system 300 according to the present exemplary embodiment can observe a plurality of side surfaces of the object 205.

Figure 4A:
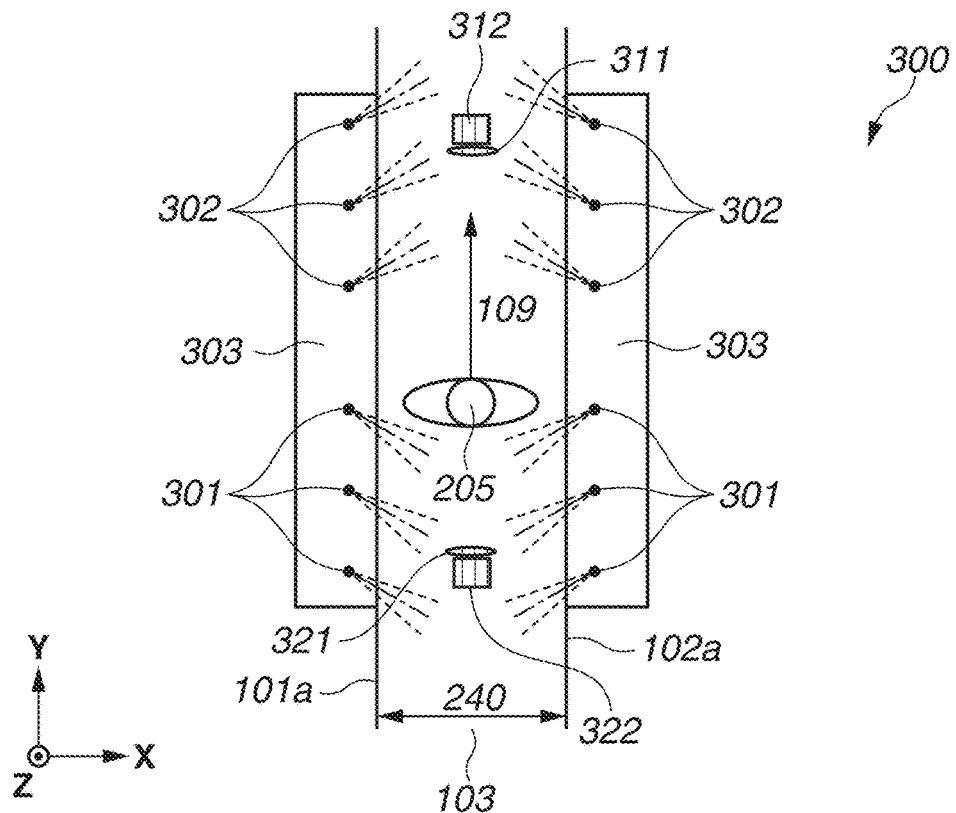
FIG. 4A is a schematic view illustrating a terahertz wave camera system according to a third exemplary embodiment.
Figure 4B:
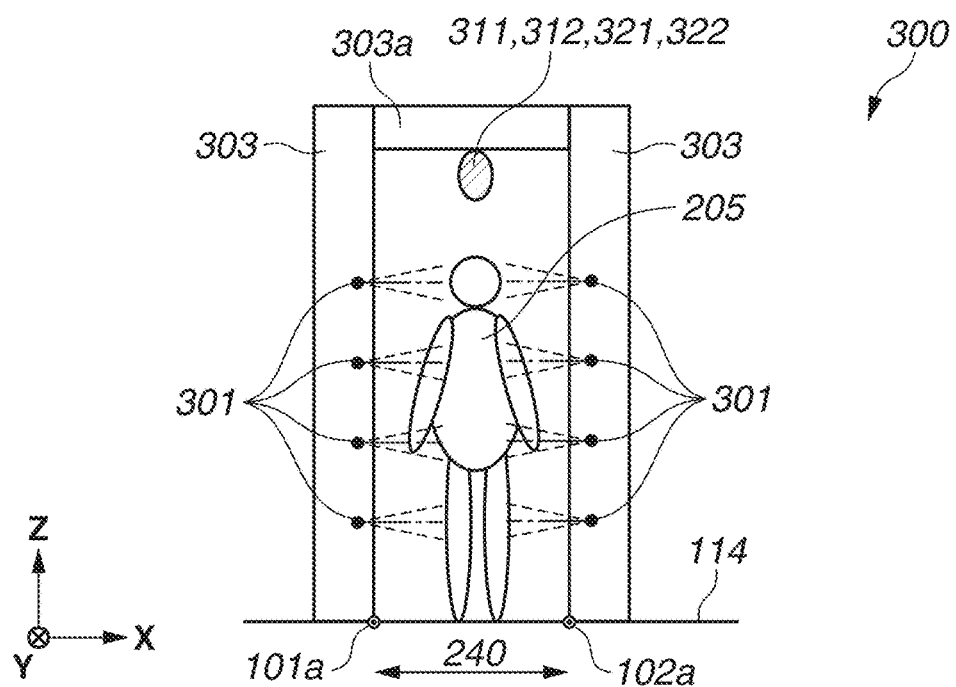
FIG. 4B is a schematic view illustrating the terahertz wave camera system according to the third exemplary embodiment.
Figure 5A:
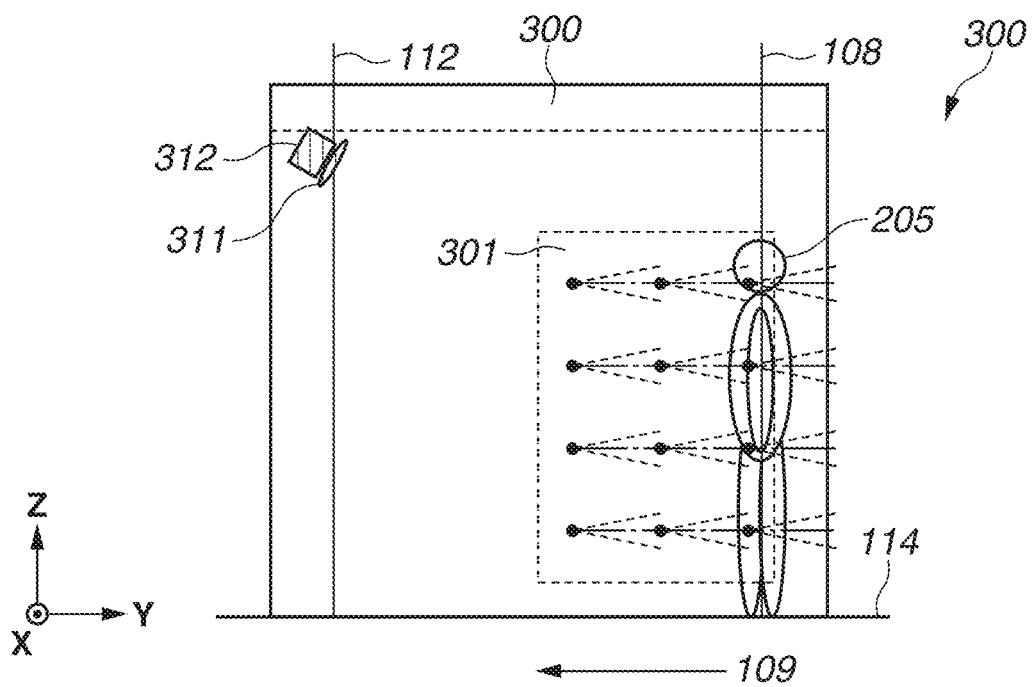
FIG. 5A is a schematic view illustrating the terahertz wave camera system according to the third exemplary embodiment.
Figure 5B:
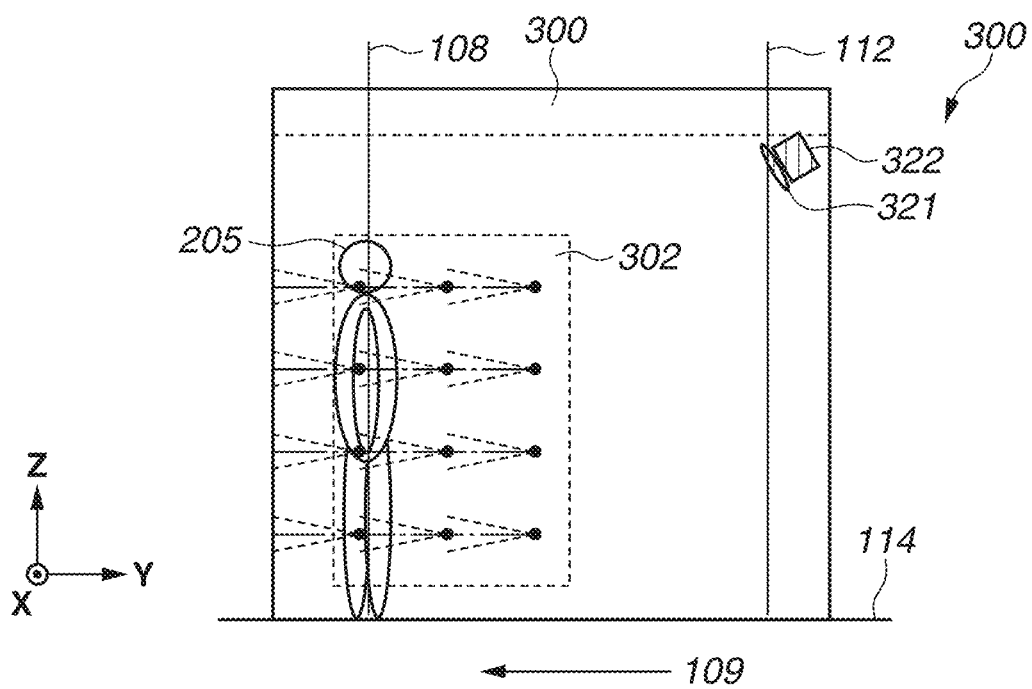
FIG. 5B is a schematic view illustrating the terahertz wave camera system according to the third exemplary embodiment.

FIG. 4A is a schematic top view of the camera system 300 and is also a schematic view illustrating a case where members and areas are projected onto a plane parallel to a plane including an X-axis and a Y-axis, and orthogonal to a Z-axis. FIG. 4B is a schematic front view of the camera system 300 and is a schematic view viewed in the Y-axis direction. FIGS. 5A and 5B are schematic side views. FIGS. 5A and 5B are schematic side views at different timings. In the following description, FIGS. 4A to 5B can be cross-referenced. Each figure will occasionally omit a component that is not used in the description of the figure. In FIGS. 4A to 5B, components described above are not described.

As illustrated in FIG. 4A, in the camera system 300, two sets are provided in a support column 303. One of the sets includes a plurality of transmission units 301 and a reception unit 312 including a lens unit 311. The other set includes a plurality of transmission units 302 and a reception unit 322 including a lens unit 321. In the present exemplary embodiment, the numbers of transmission units and the numbers of reception units in the respective sets are equal to each other. Alternatively, the numbers of transmission units and the numbers of reception units in the respective sets may be different from each other. The placement of each set may also be changed so that a transmission unit in one of the sets and a transmission unit in the other set are alternately disposed. The support column 303 is a member composing a passage 103 and is composed of a single set of members across the passage 103. As illustrated in FIG. 4B, the support column 303 is a so-called gate type in which the members of the support column 303 are connected together by an upper portion 303a. The upper portion 303a, however, may not be provided. In the present exemplary embodiment, the reception units 312 and 322 are installed in the upper portion 303a. Alternatively, the reception units 312 and 322 may be provided in the support column 303.

The transmission units 301 and the reception unit 312 including the lens unit 311 can observe the front surface of an object 205 moving through the passage 103 along a forward direction 109. The transmission units 302 and the reception unit 322 including the lens unit 321 can observe the back surface of the object 205 moving through the passage 103 along the forward direction 109. A plurality of transmission units and a plurality of reception units are thus prepared, whereby it is possible to increase observation surfaces of the object 205. The observation surfaces are increased, whereby it is possible to improve the probability of detecting a concealed object included in the object 205.

FIG. 5A illustrates a schematic side view at the timing when the object 205 starts entering the passage 103. Terahertz waves are emitted from the transmission units 301, and reflected terahertz waves are received by the reception unit 312. A plane 108 as the surface of the object 205 used in the first exemplary embodiment and a plane 112 as a plane including the lens unit 311 are at positions illustrated in FIG. 5A. With this configuration, it is possible to observe the front surface of the object 205.

FIG. 5B illustrates a schematic side view at the timing when the object 205 finishes passing through the passage 103. Terahertz waves are emitted from the transmission units 302, and reflected terahertz waves are received by the reception unit 322. The planes 108 and 112 are at positions illustrated in FIG. 5B. With this configuration, it is possible to observe the back surface of the object 205.

As illustrated in FIGS. 4B, 5A, and 5B, the transmission units 301 and 302 are composed of a plurality of point light sources, all the directional axes of the point light sources are parallel to each other, and the directional axes are parallel to a plane 114. The directions of the terahertz waves emitted from the transmission units 301 and 302 are not limited to these. It is possible to change the positions or the directions of the transmission units 301 to satisfy the conditions illustrated in the first exemplary embodiment. In one embodiment, the terahertz waves should be emitted from a plurality of directions to the object 205.

Figure 6A:
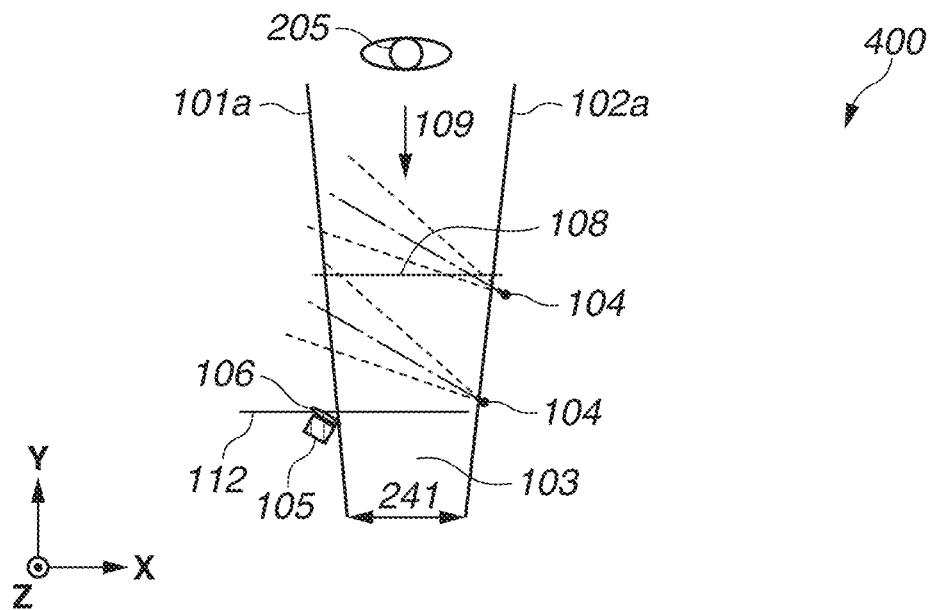
FIG. 6A is a schematic view illustrating a terahertz wave camera system according to a fourth exemplary embodiment.

With reference to FIG. 6A, a terahertz wave camera system 400 according to a fourth exemplary embodiment is described. The present exemplary embodiment is different from the second exemplary embodiment in that the width of the passage 103 changes. FIG. 6A is a schematic top view of the camera system 400 and is also a schematic view illustrating a case where members and areas are projected onto a plane parallel to a plane including an X-axis and a Y-axis, and orthogonal to a Z-axis. FIG. 6A corresponds to FIG. 3A, and the differences from FIG. 3A are described.

In FIG. 6A, the angle between the boundary 101a and the Y-axis is 0° or more, and the angle between the boundary 102a and the Y-axis is 0° or more. The distance between the boundaries 101a and 102a, i.e., a width 241, narrows along the direction 109. The width 241 thus changes, whereby it is possible to limit the range of motion of the object 205 and lengthen the time in which the object 205 is within the angle of view of the reception unit 105. The time in which the object 205 is imaged extends, whereby it is possible to improve the probability of detecting a concealed object included in the object 205.

Figure 6B:
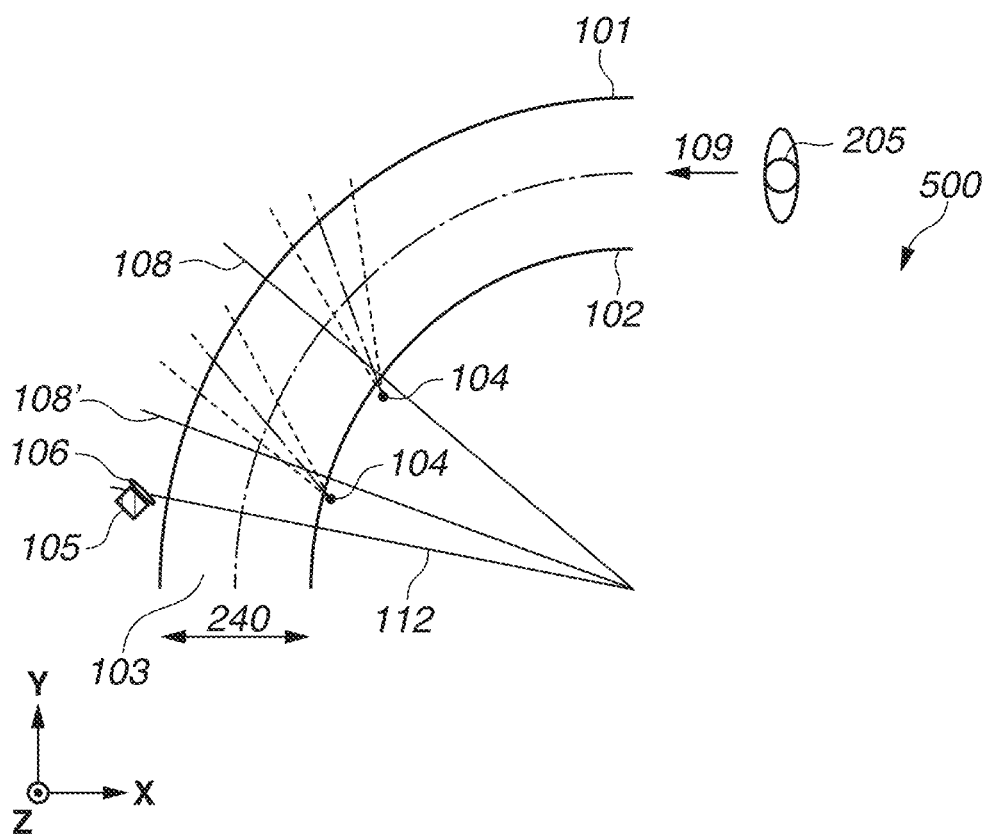
FIG. 6B is a schematic view illustrating a terahertz wave camera system according to a fifth exemplary embodiment.

With reference to FIG. 6B, a terahertz wave camera system 500 according to a fifth exemplary embodiment is described. The present exemplary embodiment is different from the second exemplary embodiment in that the passage 103 is curved. FIG. 6B is a schematic top view of the camera system 500 and is also a schematic view illustrating a case where members and areas are projected onto a plane parallel to a plane including an X-axis and a Y-axis, and orthogonal to a Z-axis. FIG. 6B corresponds to FIG. 3A, and the differences from FIG. 3A are described.

In FIG. 6B, the distance between the boundaries 101a and 102a, i.e., the width 240, is constant. As described above, the forward direction 109 of the passage 103 is a line connecting points at equal distances on line segments connecting the boundaries 101a and 102a. In this case, the forward direction 109 is curved. The forward direction 109 of the object 205 is thus changed, whereby it is possible to change the angle at which the camera 105 images the object 205. That is, it is possible to observe the object 205 at various angles and improve the probability of detecting a concealed object included in the object 205.

Figure 7A:
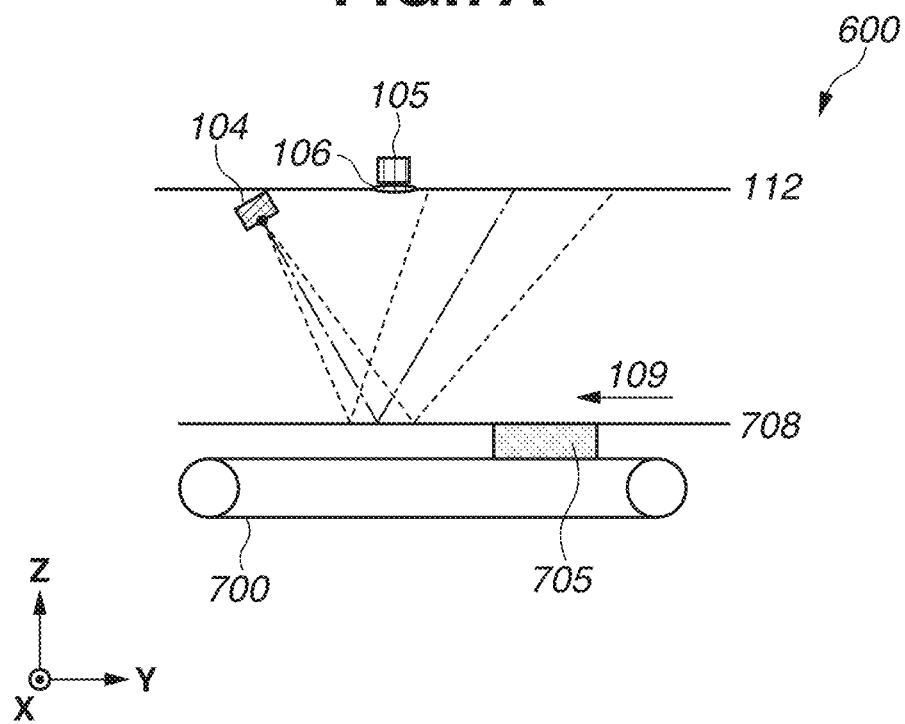
FIG. 7A is a schematic view illustrating a terahertz wave camera system according to a sixth exemplary embodiment.
Figure 7B:
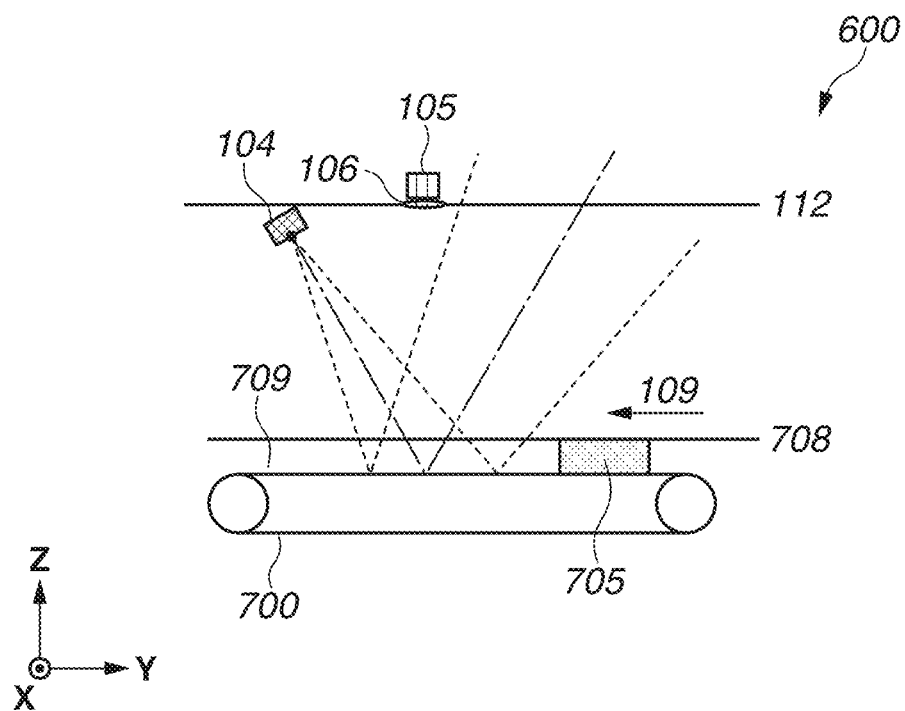
FIG. 7B is a schematic view illustrating the terahertz wave camera system according to the sixth exemplary embodiment.

With reference to FIGS. 7A and 7B, a terahertz wave camera system 600 according to a sixth exemplary embodiment is described. The present exemplary embodiment is different from other exemplary embodiments in that the passage 103 is a conveyor belt 700.

FIG. 7A is a schematic side view of the camera system 600. In the present exemplary embodiment, an upper surface of an object 705 is defined as a plane 708. At this time, an area formed on the plane 112 by a terahertz wave reflected from the plane 708 and the lens unit 106 are not superimposed on each other. The transmission unit 104 and the reception unit 105 are thus placed, whereby it is possible to obtain an image of the object 705 in which information regarding the upper surface of the object 705 is reduced.

FIG. 7B is a schematic side view of the camera system 600. In FIG. 7B, in contrast to FIG. 7A, a conveying surface of the conveyor belt 700 is defined as a plane 709. At this time, an area formed on the plane 112 by a terahertz wave reflected from the plane 709 and the lens unit 106 are not superimposed on each other. The transmission unit 104 and the reception unit 105 are thus placed, whereby it is possible to obtain an image of the object 705 in which information regarding the conveying surface of the conveyor belt 700 is reduced.

In the present exemplary embodiment, the planes 708 and 709 may be set so that areas formed by reflected terahertz waves reflected from the planes 708 and 709 and the lens unit 106 are not superimposed on each other. It is possible to reduce information regarding a covering object, such as a packing material, of the object 705 in addition to the information regarding the upper surface of the conveyor belt 700.

Based on the terahertz wave camera system according to each of the above exemplary embodiments, it is possible to acquire information based on a terahertz wave in which noise is reduced.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-036119, filed Mar. 3, 2020, which is hereby incorporated by reference herein in its entirety.

What is claimed is:

1. A system comprising a transmission unit configured to transmit a terahertz wave, a reception unit configured to receive the terahertz wave, and a lens unit provided in the reception unit, the system placed in a passage,
wherein in a case where a first plane and a second plane are set, in a top view,
the first plane intersects a forward direction of the passage and is includes at least a part of a surface of an object, and
the second plane intersects the forward direction of the passage, is disposed at a position superimposing at least a part of the lens unit and at a position different from a position of the first plane,
and is irradiated by a reflected terahertz wave that is the terahertz wave reflected at the first plane,
wherein, when an area receiving the reflected terahertz wave of the second plane is defined as a first area, the first area and the lens unit are disposed at positions different from each other on the second plane.

2. The system according to claim 1, wherein a size of an angle between a directional axis of the terahertz wave emitted from the transmission unit and the first plane and a size of an angle between an optical axis of the lens unit and the first plane are different from each other.

3. The system according to claim 1, wherein a distance between the transmission unit and the reception unit is 0.25 m or more and 3.0 m or less.

4. The system according to claim 3, wherein the distance between the transmission unit and the reception unit is 0.50 m or more and 2.0 m or less.

5. The system according to claim 1, wherein the passage is formed between a first area along the forward direction and a second area along the forward direction.

6. The system according to claim 5,
wherein the transmission unit is installed in the first area, and the reception unit is installed in the second area, and
wherein a distance between the transmission unit and the first plane and a distance between the reception unit and the first plane are different from each other.

7. The system according to claim 5, wherein a distance between the first and second areas is 0.25 m or more and 3.0 m or less.

8. The system according to claim 7, wherein the distance between the first and second areas is 0.50 m or more and 2.0 m or less.

9. The system according to claim 1, wherein the terahertz wave has a circularly polarized wave.

10. The system according to claim 1, wherein the terahertz wave has a linearly polarized wave.

11. The system according to claim 1, wherein the terahertz wave is incident on the first plane at an angle at which the terahertz wave has a P wave.

12. The system according to claim 1, wherein the reception unit includes a reception element configured to receive the terahertz wave.

13. The system according to claim 12, wherein a focus of the lens unit is located at the reception element.

14. The system according to claim 1,
wherein a second area is formed on the first plane by the terahertz wave emitted from the transmission unit, and
wherein the first area is formed on the second plane by the terahertz wave reflected from the second area.

15. The system according to claim 14, wherein a half value of an intensity of the terahertz wave emitted from the transmission unit forms an outer edge of the second area.

16. The system according to claim 14, wherein 1/e of an intensity of the terahertz wave emitted from the transmission unit forms an outer edge of the second area, where e is the Napier's constant.

17. An entry/exit management apparatus comprising the system according to claim 1.

18. A system comprising a transmission unit configured to transmit a terahertz wave, a reception unit configured to receive the terahertz wave, and a lens unit provided in the reception unit, the system placed in a passage,
wherein in a case where
a first plane and a second plane are set, in a top view,
the first plane intersects a forward direction of the passage and includes at least a part of a surface of an object, and
the second plane intersects the forward direction of the passage, is disposed at a position superimposing at least a part of the lens unit and at a position different from a position of the first plane and is irradiated by a reflected terahertz wave that is the terahertz wave reflected at the first plane, wherein, when an area receiving the reflected terahertz wave of the second plane is defined as a first area, the first area and the lens unit are disposed at positions different from each other on the second plane, wherein the terahertz wave is incident on the first plane at an angle at which the terahertz wave has a P wave.

19. A system comprising a transmission unit configured to transmit a terahertz wave, a reception unit configured to receive the terahertz wave, and a lens unit provided in the reception unit, the system placed in a passage, wherein in a case where a first plane and a second plane are set, in a top view, the first plane intersects a forward direction of the passage and includes at least a part of a surface of an object, the second plane intersects the forward direction of the passage, is disposed at a position superimposing at least a part of the lens unit and at a position different from a position of the first plane and is irradiated by a reflected terahertz wave that is the terahertz wave reflected at the first plane, wherein, when an area receiving the reflected terahertz wave of the second plane is defined as a first area and an area receiving the terahertz wave of the first plane is defined as a second area, the first area and the lens unit are disposed at positions different from each other on the second plane, wherein $1/e$ of an intensity of the terahertz wave emitted from the transmission unit forms an outer edge of the second area, where e is the Napier's constant.

* * * * *